United States Patent [19]
Chovan

[11] Patent Number: 5,941,271
[45] Date of Patent: Aug. 24, 1999

[54] WATER RELEASE VALVE

[76] Inventor: Dale Chovan, 3465 Rte. 130, Harrison City, Pa. 15636

[21] Appl. No.: 08/794,849

[22] Filed: Feb. 4, 1997

[51] Int. Cl.⁶ .................................................. F16K 49/00
[52] U.S. Cl. ........................................... 137/204; 137/341
[58] Field of Search ..................................... 137/203, 204, 137/341

[56] References Cited

U.S. PATENT DOCUMENTS

| | | | |
|---|---|---|---|
| 891,808 | 6/1908 | Adams | 137/204 X |
| 948,344 | 2/1910 | Radick | 251/63 |
| 3,262,464 | 7/1966 | Frantz | 137/204 |
| 3,575,199 | 4/1971 | Beattie | 137/203 X |
| 3,580,267 | 5/1971 | Baker | 137/203 |
| 3,977,426 | 8/1976 | Pyle | 137/204 |
| 4,883,995 | 11/1989 | Rink, Jr. . | |
| 4,928,724 | 5/1990 | Margerum . | |
| 5,205,315 | 4/1993 | Margerum | 137/203 X |

Primary Examiner—Gerald A. Michalsky
Attorney, Agent, or Firm—James Ray & Associates

[57] ABSTRACT

Water release valve for a compressed air system. It has a service connection for attachment to a low point of the compressed air system. The valve has a body which has an internal space, part of which is a cylindrical bore. It also has a pilot connection for attachment of a pilot pressure obtained from the compressed air system, and the valve has an exhaust port for releasing air and water from the system. It has one or more pistons placed in the cylindrical bore. At least one of the pistons has a position determined by the pilot pressure. The piston closest to the service end may be placed in two different positions. In one of the positions, it closes the flowpath from the service connection to the exhaust. In the second position, it opens the flowpath.

1 Claim, 6 Drawing Sheets

WATER RELEASE VALVE

FIELD OF THE INVENTION

The present invention relates, in general, to a water release valve for a compressed air system and, more particularly, the instant invention relates to a water release valve for a vehicle having an airbrake system, and applies also to stationary compressed air systems.

BACKGROUND OF THE INVENTION

When air is drawn into an air compressor, all the constituent gases and vapors in the ambient atmosphere are drawn into the compressor in the same proportion as the proportions in the ambient atmosphere. For example, if a compressed air system provides air at a gage pressure of 102.9 psi, and the ambient atmosphere has an absolute pressure of 14.7 psi, the absolute pressure has increased by a factor of eight. Vapors in the atmosphere, notably water a vapor, which may be at a partial pressure below the dew point at the temperature of the ambient atmosphere, are compressed to a partial pressure which is increased eightfold, and may greatly exceed the dewpoint for air at the temperatures in the compressed air system. Hence, the vapors, notably water vapor, condense in the compressed air system, causing water to collect at low points in the system.

Water has a density vastly greater than does air, and hence acts very differently from air when it flows through valves, flow conduits, and orifices of a compressed air system. Indeed, if a mixture of water and air flow through an orifice or valve, the air may drive masses of water at a high speed, which act like bullets, causing noise and damaging the system. Also, if an air cylinder used for cushioning a force becomes filled with water, it becomes rock hard and does not provide the required cushioning.

Hence, compressed air systems generally have water release valves which are opened occasionally to eject water, or a mixture of water and air. An example of a prior art valve is given in U.S. Pat. No. 4,928,724 entitled "Automatic Wet Tank Drain Valve". This valve is activated by electrical or mechanical means. Other drain valves are operated manually.

Automatic valves of the prior art are generally not very satisfactory. For example, some of them, after being opened, permit a major loss of pressure from the compressed air system before closing. For example, such valves may lose as much as 20% of their pressure after a valve is opened, and before it closes.

SUMMARY OF THE INVENTION

The system provides a water release valve for a compressed air system, which is to be attached to a low point of the compressed air system. The water release valve has a valve body having an internal space which has a portion formed as a cylindrical bore. It also has a connector at a first end of the valve for attachment to a low point in the compressed air system. It also has a second connector at the second end of the valve for attachment of a pilot pressure obtained from the compressed air system, and the valve has an exhaust port for releasing air and water from the system.

The valve also has a piston placed in the cylindrical bore. The piston may be placed in two different positions. In a first one of the positions, it closes a flowpath from the first connector to the exhaust. In the second position, it opens the flowpath.

In an additional aspect, the invention provides a release valve for a compressed air system for attachment to a low point of the compressed air system, the water release valve having:

(a) a valve body having an internal space, the internal space having at least a subportion formed as a cylindrical bore. The valve body also has a first connection means at a first end of the valve body for attaching the water release valve to the low point of the compressed air system, and a second connection means at a second end of the valve body for receiving a pilot pressure from the compressed air system, and an exhaust port.

The valve has a first piston disposed at least partially within the cylindrical bore, the first piston moveable between a first position and a second position, the first piston in the first position providing an obstruction occluding an exhaust flowpath for fluid from the first connection means to the exhaust port, the piston in the second position removing the obstruction thereby opening the exhaust flowpath from the first connection means to the exhaust port;

The valve also has a first seal which has a diameter less than the diameter of the first piston. The seal is disposed between the first end of the first piston and the first end of the valve body to seal off the flowpath when the first piston is in the first position.

The valve also has a second seal disposed between an outer diameter of the first piston and the bore of the valve body to prevent airflow past the first piston, a gap formed between the first seal and second seal communicating with the exhaust port, so that when equal pressures prevail at the first end of the piston and a second end of the piston, a force on a the piston due to air at its second end, sealed at the second seal, exceeds a force on the piston at an inner portion of its first end, enclosed within the first seal, whereby the first piston is forced to its first position, so that the first seal seals off the flow passage;

The valve also has a second piston disposed at least partially within the cylindrical bore coaxially with the first piston, the second piston moveable to contact the second end of the first piston at a first end of the second piston, and moveable to a seated position to contact a third seal against the second end of the valve body at a second end of the second piston. The third seal closing off the second connection means when the second piston is in the seated position.

The valve has a spring in contact with a portion of the second end of the valve body and a portion of the second piston to press the second piston against the first piston whereby the first piston moves to the first position and the first seal is compressed to close the valve. This occurs when a first pressure at the first connection means is approximately equal to a second pressure at the second connection means;

A timing volume is formed within the first piston, the timing volume communicating with the second end of the first piston. A timing flow passage in a timing member provides a small flow passage between the first end of the valve body and the timing volume whereby the valve functions as follows:

If a relatively high pressure exists at both the first connection means and the second connection means, the spring urges the second piston toward the first piston, thus forcing the first piston against the first seal and placing the valve in a shut off position. Then, if a sudden drop of pressure occurs at the second connection means, both pistons are pressed toward the second end of the valve body by a pressure difference between the pressure at the first connection means and a the pressure at the second connection means. This provides an opening through which air from the first end of the valve body flows out of the exhaust port. Simultaneously, air flows through the timing flow passage into the timing chamber to equalize a pressure between the first cylinder and the second cylinder with the pressure at the first connection means, at a predetermined rate determined by the volume of the timing chamber and the flow impedance of the timing flow passage, whereby the first seal enclosing a relatively small area and the second seal enclosing a relatively large area, cause the first piston to experience a force directed to the first end of the valve body whereby the first piston is moved to the first position thereby compressing the first sealing means and shutting off the valve.

OBJECTS OF THE INVENTION

It is, therefore, one of the primary objects of the present invention to provide a water release valve for a compressed air system. The valve is to be activated by a pressure which is already available in the compressed air system, which, on various occasions has a change in pressure which can be used to trigger an open condition of the water release valve.

Another object of the present invention is to provide a water release valve for a compressed air system which has an unloader line connected to an output of a compressor of the system, the unloader line being opened to the pressure of the atmosphere when the compressor is turned off, so the compressor does not need to start against a backpressure. In this embodiment, the unloader line triggers an open condition of the water release valve whenever the compressor turns off.

Still another object of the present invention is to provide a water release valve for a compressed air system which is triggered to an open condition by an air line which is depressurized to cause an application of brakes.

Yet another object of the present invention is to provide a water release valve for a compressed air system on a vehicle which is triggered to an open condition by an air line which is depressurized to cause an application of brakes on the vehicle.

A particular object of the present invention is to provide a water release valve for a highway vehicle which is triggered by a drop in pressure of the emergency brake air line, which is depressurized to cause an emergency brake application.

Yet another object of the present invention is to provide a water release valve which, after being triggered to an open condition, remains open for a timed interval and then closes to prevent excessive loss of air.

Still another object of the present invention is to provide a water release valve which can be adjusted so that after being opened, it shuts off before an excessive pressure drop in the compressed air system occurs.

In addition to the various objects and advantages of the present invention which have been generally described above, there will be various other objects and advantages of the invention that will become more readily apparent to those persons who are skilled in the relevant art from the following more detailed description of the invention, particularly, when such detailed description is taken in conjunction with the attached drawing figures and with the appended claims.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures, for the sake of clarity and understanding of the invention.

Figure 1A:
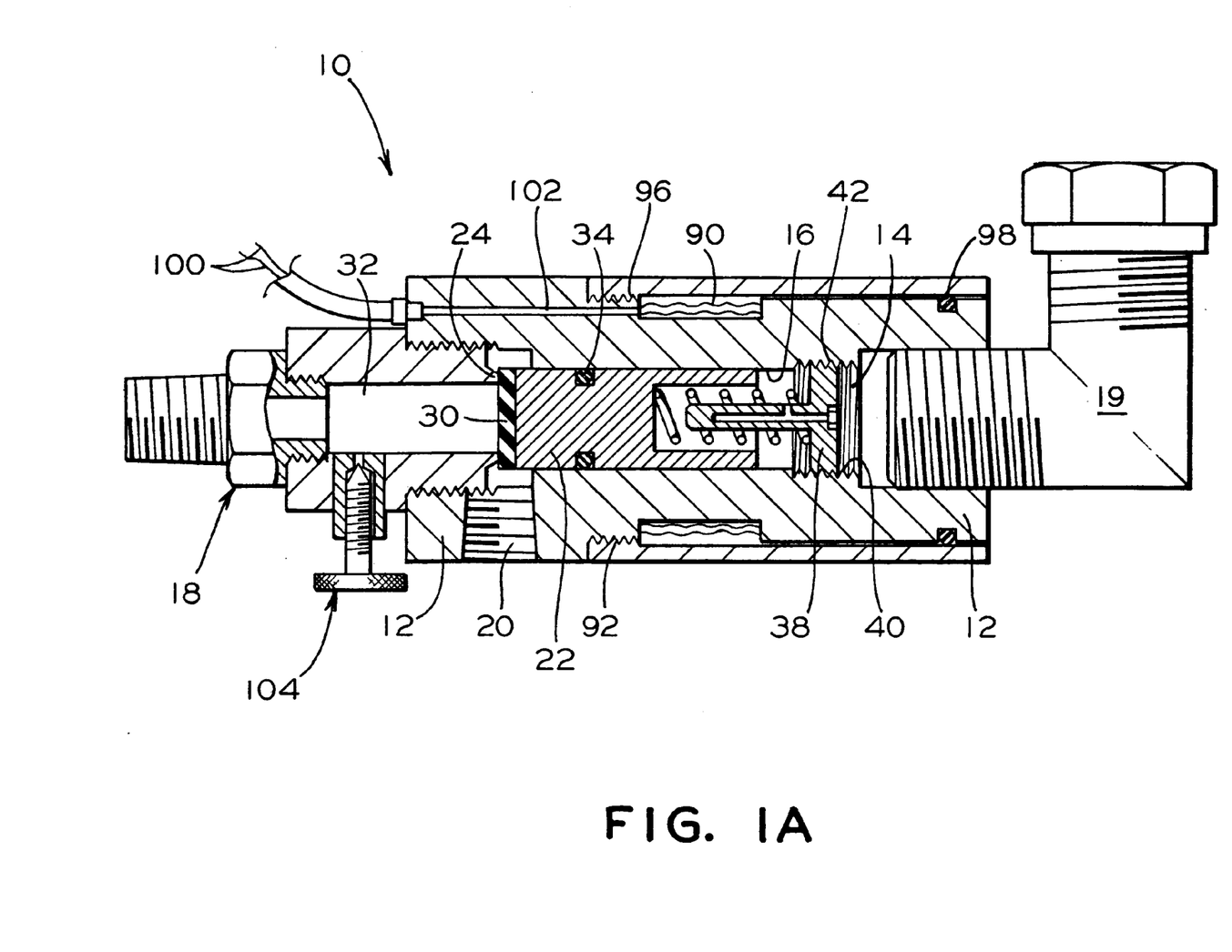
FIG. 1A is a sectional view of a first embodiment of the invention.
Figure 1B:
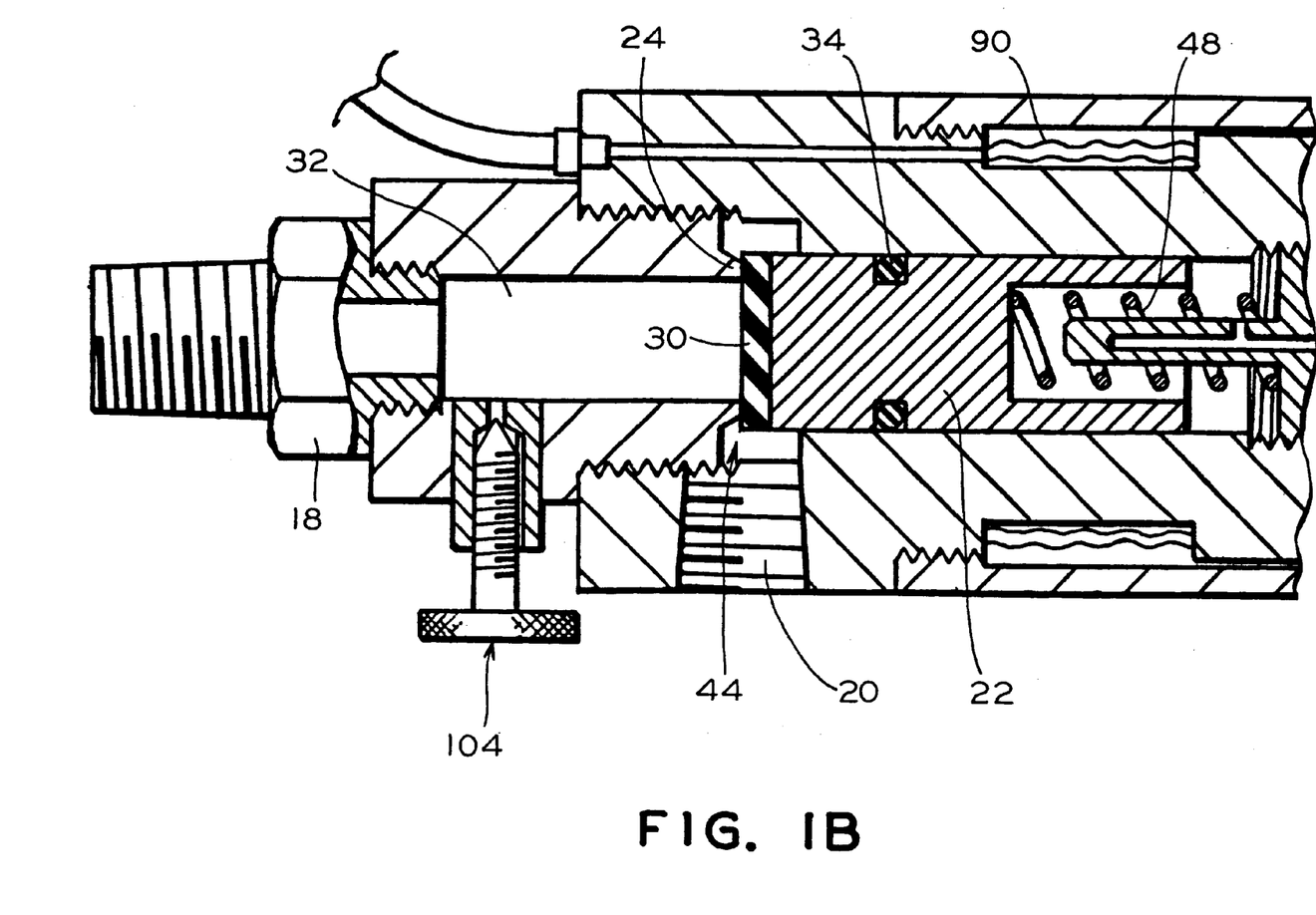
FIG. 1B is a blowup of portions of FIG. 1, and shows the valve in a closed position.
Figure 1C:
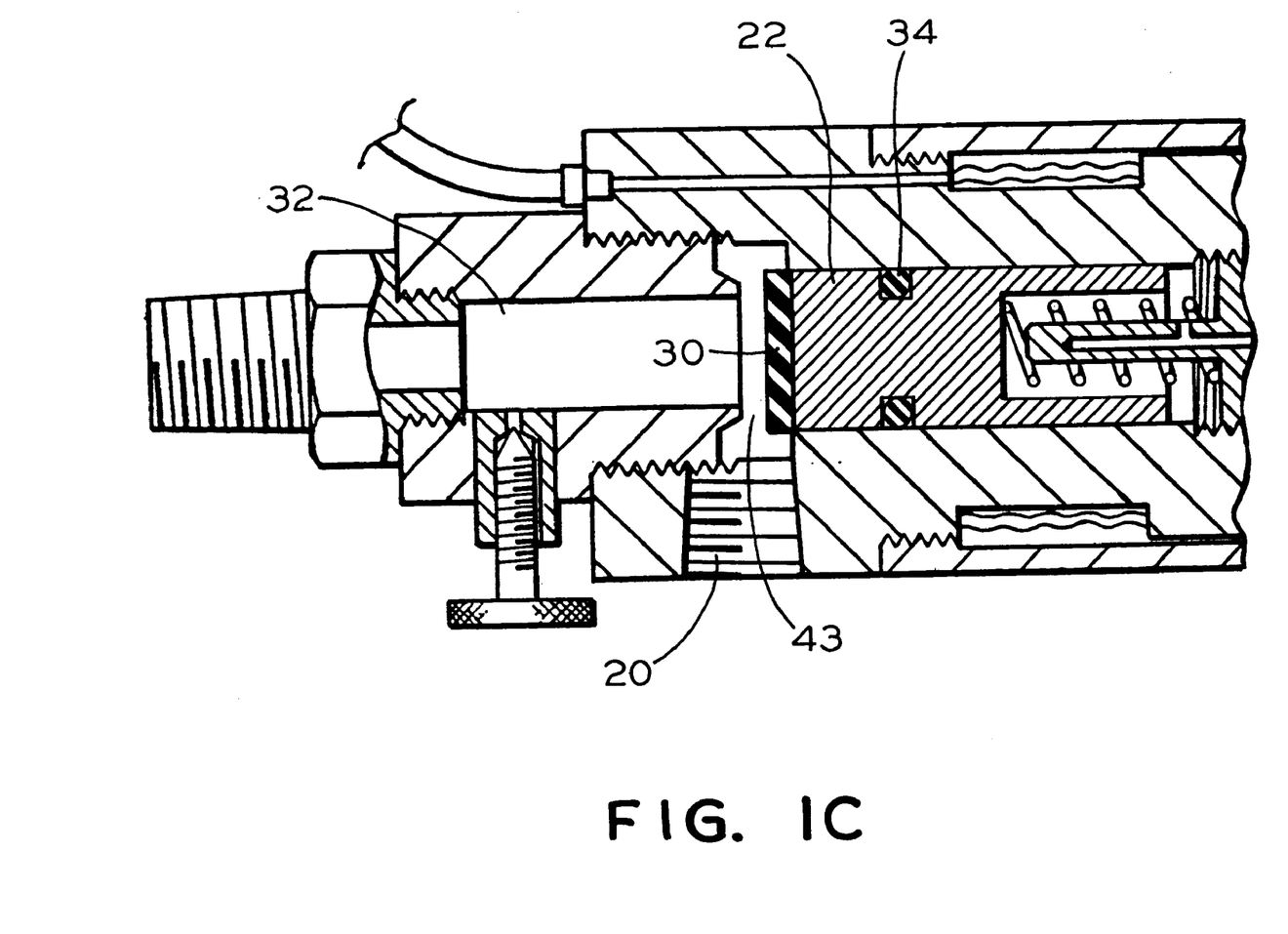
FIG. 1C shows the valve of the first embodiment in the open position.

FIGS. 1A, 1B, and 1C show a first embodiment 10 of the invention. It has valve body 12 having internal space 14, and a cylindrical bore 16 surrounding a portion of internal space 14. It has first connection means 18 for connection to a low point of a compressed air system, and a second connection means 19 for a pilot pressure connection. Valve 10 is closed when a high pressure is applied to second connection means 19, and is opened when a low pressure is applied to second connection means 19. For example, on tractor-trailer combinations, it is common to use two brakelines attached between the cab and the trailer. The first of these is for application of brakes, and the second is pressurized to release parking brakes which are spring loaded to an applied position, and which are applied when pressure drops in the second of the two brakelines. This second brakeline can be connected to second connection means 19, so that valve 10 is activated whenever the parking brakes are set.

Valve body 12 has an exhaust port 20 and a first piston 22 which positions a first seal 30 to open or close a flowpath 43 between internal space 32 of first attachment means 18 and exhaust port 20. Flowpath 43 is shown open in FIG. 1C. FIG. 1B shows said first piston 22 in a first position in which it positions first seal 30 so as to close flowpath 43. FIG. 1C shows first piston 22 in a second position which positions first seal 30 to open flowpath 43 from inner space 32 to exhaust port 20.

These figures show a second seal 34 which seals between first piston 22 and bore 16, so that piston 22 experiences a force toward said first connection means 18, or second connection means 19, depending upon the pressure difference between the first connection means 18 (which receives the pressure at the low point of the compressed air system, not shown), and the second connection means 19, to which the pilot pressure is connected. A first spring 48, labelled in FIG. 1B, biases piston 22 toward said first connection means 18, so that when equal pressures are applied to both first connection means 18 and second connection means 19, first sealing means 30 on piston 22 is biased against said first connection means 18. This places obstruction 44, which includes a portion of first sealing means 30 and first attachment means 18 to block flowpath 43. First spring 48 is pressed by spring seat member 38, which has external threads 42 to mate with internal threads 40 of inner space 14. Spring seat member 38 may be adjusted toward or away from the first connection means 18 by rotating spring seat member 38 about the axis of bore 16. Spring seat member 38 has a screwdriver slot, hexagonal hole, or other means (not shown) at its end towards second connection means 19, so it can be adjusted by a screwdriver, hexagonal wrench, etc,. It may be necessary to remove second connection means 19 to do this. The adjustment of spring seat member 38 may be used to limit the pressure drop which occurs after the valve is opened by a drop in the pilot pressure.

Figure 2A:
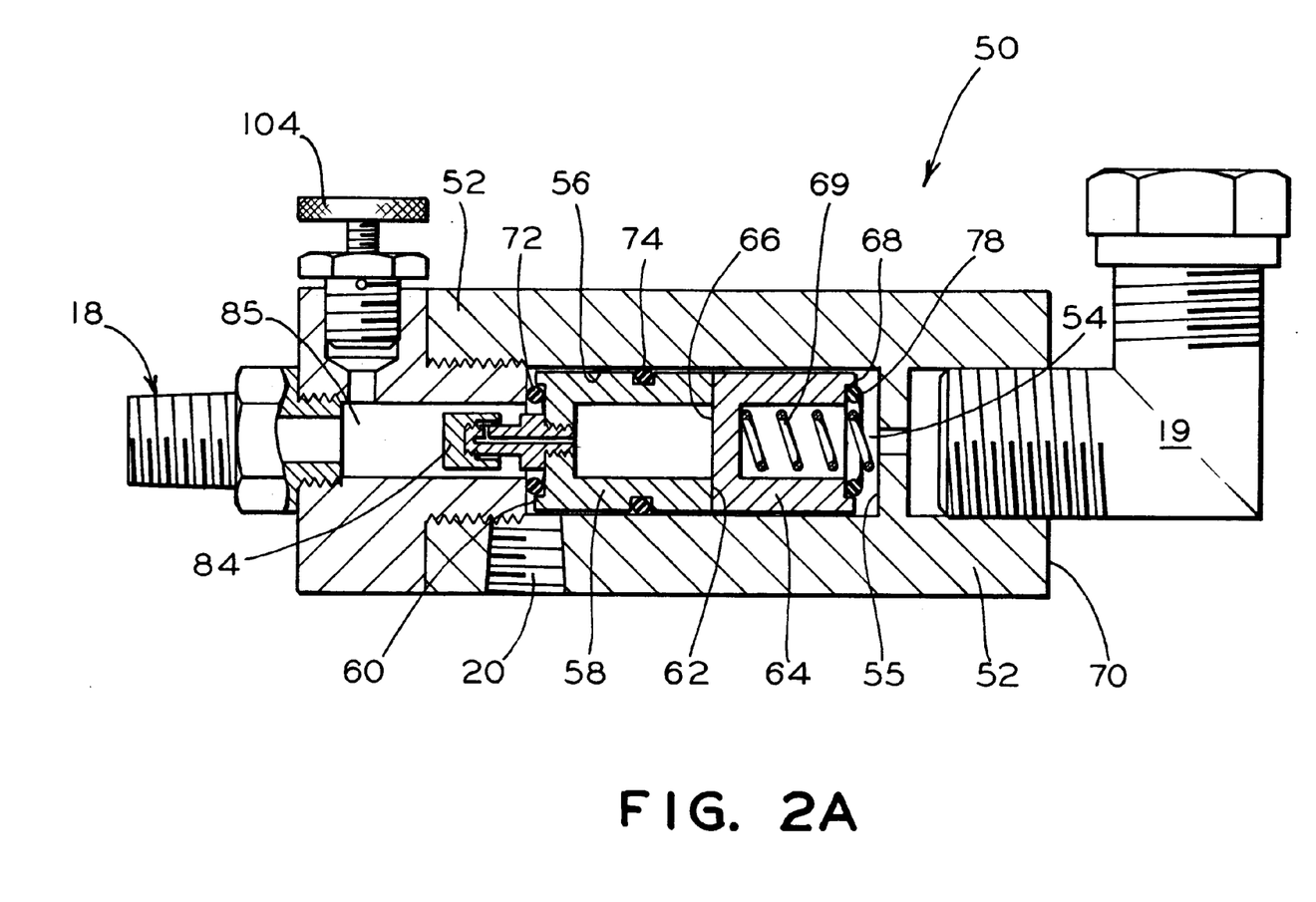
FIG. 2A shows a second embodiment of the invention
Figure 2B:
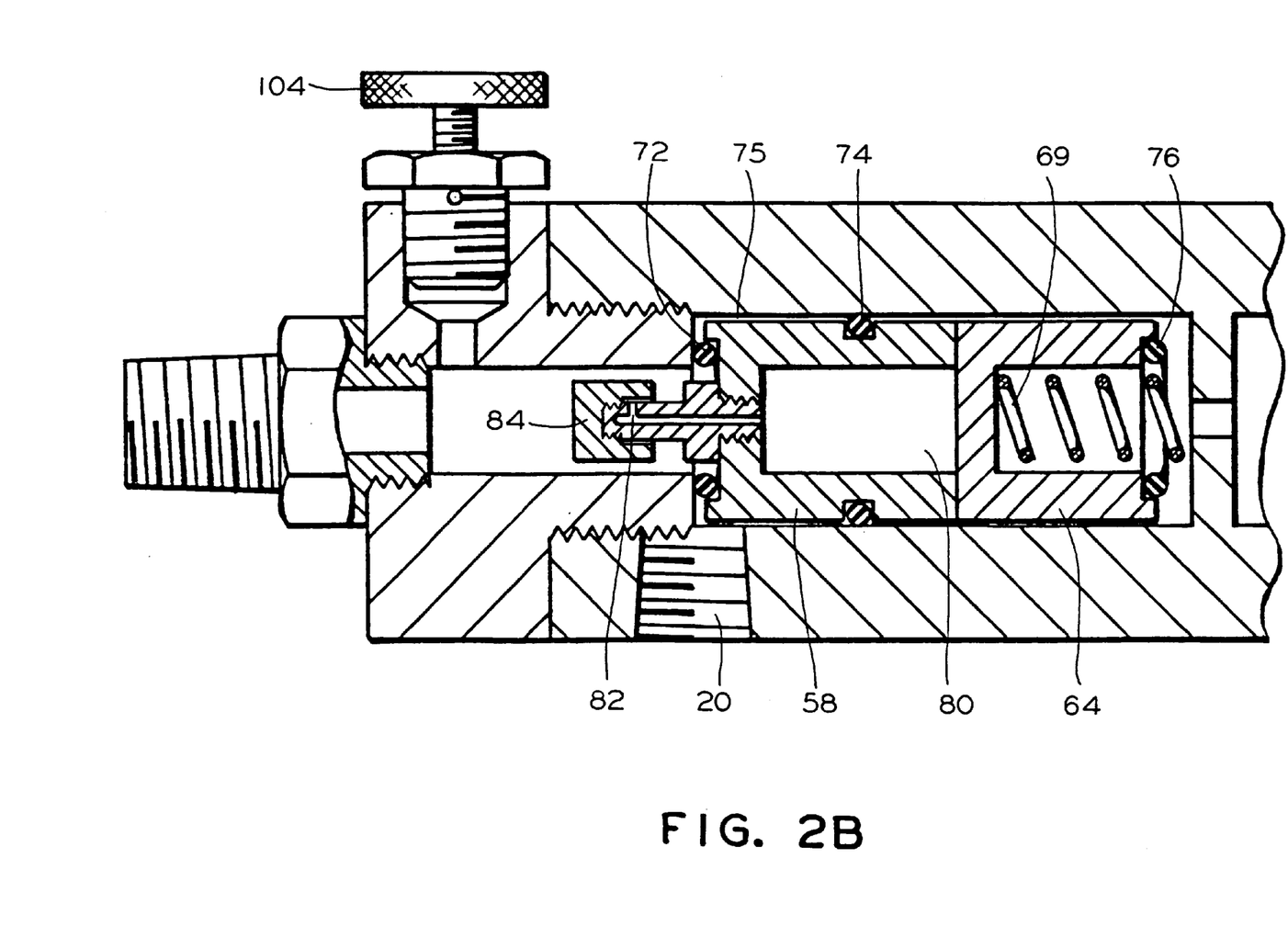
FIG. 2B is a blowup of portions of FIG. 2.

A second embodiment of the invention 50 is shown in FIGS. 2 and 2A. Valve 50 has valve body 52 which has internal space 54, which has pilot pressure end 55. Internal space 54 has bore 56. A first piston 58 of embodiment 50 is disposed in bore 56. The first end of piston 58 is denoted 60 and the second end is denoted 62. Valve 50 also has a second piston 64 likewise disposed in bore 56. Second piston 64 has first end 66 and second end 68. A second spring 69 presses against pilot pressure end of body 52 to press second piston 64 toward said first piston, pressing its second end 62 by the second piston's first end 66. Hence said first piston 58 is biased against the first seal 72 of valve 50. Second seal 74 seals between an O.D. of piston 58 and bore 56. A circumferential gap 75 between said first seal 72 and said second seal 74 of valve 50 is open to exhaust port 20. First seal 72 has a smaller diameter than second seal 74, so that pressure forces generally bias first piston 22 toward first seal 72. A third seal 76 seals against end of internal space 54 if second piston 64 is moved toward end 54.

A timing volume 80 is located in said first piston 58. This volume is open to first end 66 of second piston 68. Timing volume 80 receives air through timing flow passage 82. Timing flow passage 82 has a relatively small diameter, such as, for example, 0.020". To protect timing flow passage 82 from debris, shield 84 is provided. This has a gap having a dimension less than the diameter of timing flow passage 82, which communicates with internal space 85 which communicates with the internal space in first connection means 18.

When valve 50 receives a high pressure through first connection means 18 from the low point of the compressed air system, and also receives a high pilot pressure, then spring 69 presses piston 64 to press against piston 58 and close valve 50. If valve 50 then experiences a much lower pilot pressure at the second connection means 19, then both pistons move toward pilot pressure end 55, so third seal 78 seals against end 55. Since first piston 58 moves to the right, the valve is opened. Then, air flowing through timing passage 82 into timing volume 80 causes first piston 58 to move to the left, so first seal 72 seals against first connection means 18 and the valve is closed. This occurs because second sealing means 74 encloses a larger area than first sealing means 72, and circumferential gap 75 lies between first seal 72 and second seal 76. Hence, the drop in pilot pressure caused this valve to open briefly and then close. This prevents the loss of an excessive amount of air.

Valve 50 is intended for a system in which the compressor which supplies air to the system has a relief line at the outlet of the compressor which is opened to releases air to the atmosphere after the compressor is stopped so that when it is started, it need not start against a back pressure. It is closed after the compressor is started. At that time, the pilot pressure is high and air from second connection means 19 pushes second piston 64 against first piston 58. Spring 69 assists in this motion. Then when the pilot pressure drops, pressurized air in timing volume 80 pushes second piston 64 toward said second connection means 19 so third seal 78 seals against end 55 of internal space 54. Second piston 64 is then held against end 55 by suction from second connection means 19. When second piston 64 moves toward said second connection means 19, first piston 58 does the same, opening a flow passage (not shown) to exhaust port 20. The motion of piston 64 has decreased the pressure in timing volume 80, so air flows in through timing flow passage 82. At a predetermined time dependent on the volume of timing volume 80 and the impedance of timing flow passage 82, first piston 58 moves toward said first connection means to close the flow passage (not shown) to exhaust port 20. The force needed to accomplish this motion is obtained because second seal 74 encloses a larger area than first seal 72. As a result of this action, water relief valve 50 is opened for a brief predetermined time whenever the pilot pressure makes a transition from high to low. If the pilot pressure is obtained from a relief line of the compressor, then valve 50 is opened briefly whenever the compressor shuts off.

Figure 3:
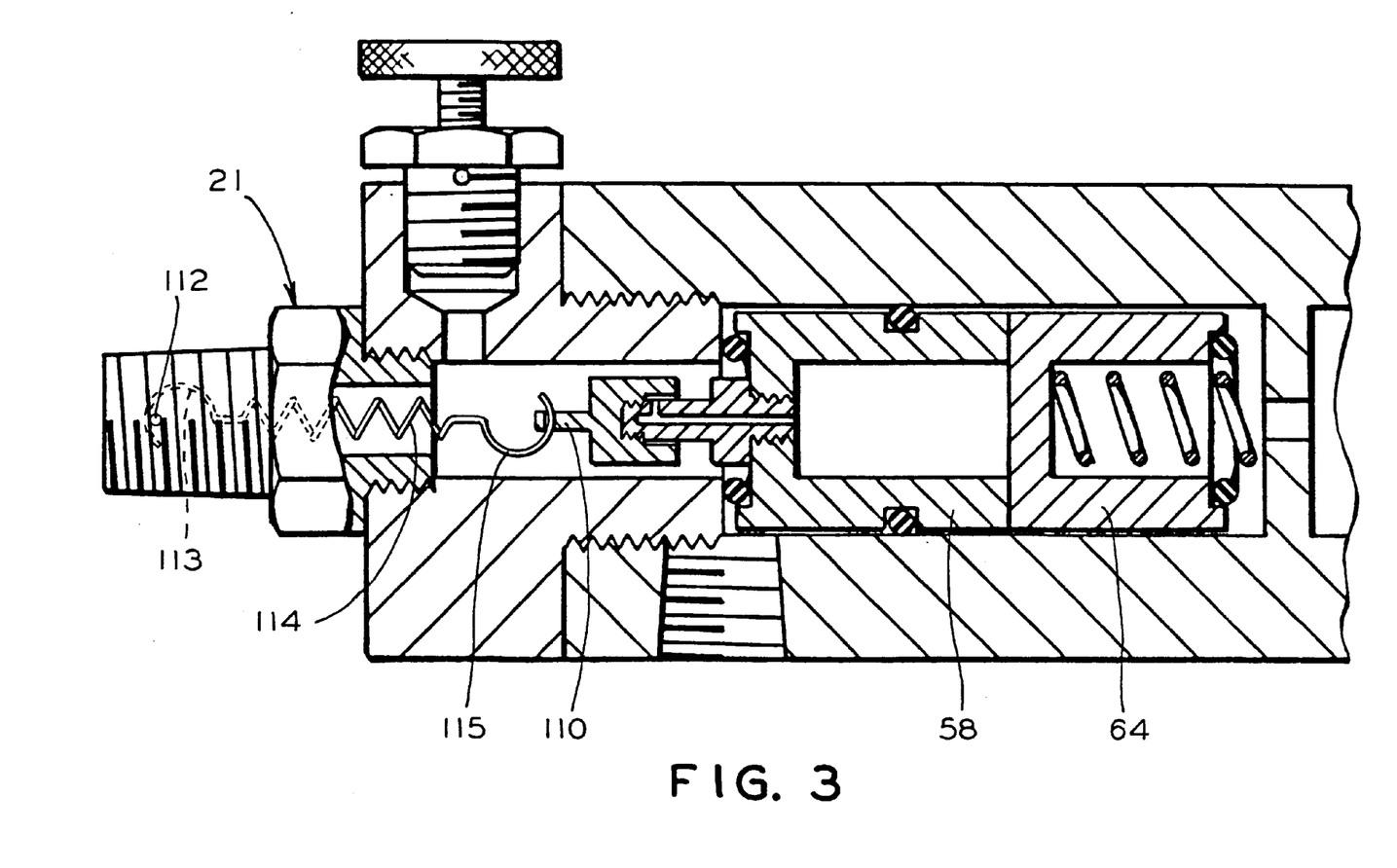
FIG. 3 shows a third embodiment having an added spring.

FIG. 3 shows a third embodiment of the invention, where a spring 114 is introduced. Spring 144 is used to bias piston 64 toward first connection means 21. Spring 114 is attached to first connection means 21 by first spring portion 113 at pin 112 of first connection means 21. Also, spring 114 is attached to modified timing shield 110 by spring portion 115.

Now, discussing the invention more broadly, there is disclosed a water release valve for a compressed air system, which is to be attached to a low point of the compressed air system. The valve has a valve body which has an internal space, part of which is formed as a cylindrical bore. It has connection means at both ends, which may, for example, be pipe fittings, tubing fittings, or an internally or externally threaded portion of the body itself. The connection means at one end is a service connection for attaching to a low point of the compressed air system, where water is to be removed. The connection means at the other end is for a pilot pressure, obtained from an air line which carries a pilot pressure which controls operation of the valve. The valve also has an exhaust port which is open to the atmosphere.

In one embodiment, the valve has a piston disposed at least partially within the cylindrical bore. The piston may be positioned in either of two positions. In the first position, it provides an obstruction occluding an exhaust flowpath for fluid from the service connection to the exhaust port. In the second position, it removes the obstruction thereby opening the exhaust flowpath from the service connection to the exhaust port. It may have a spring for biasing it toward the first position, thereby tending to close the exhaust flowpath. The piston may also receive a biasing force from the pressure at the service connection in a direction to open the exhaust flowpath, and may receive a biasing force in the opposite direction from the pilot pressure received through the pilot pressure connection, which tends to close the exhaust flowpath. The position of the piston may be determined by a balance of the biasing force due to the spring plus the biasing force due to the pilot pressure minus the biasing force due to the pressure from the service connection.

The pilot pressure connection may be for attachment to an air line of an airbrake system, the system applying one or more brakes if the pressure in the air line decreases. The air line may be a parking brake air line of a motor vehicle, for example, a tractor-trailer combination.

The obstruction in the flowpath to the exhaust port may include a seal for sealing against an inner portion of the service connection, and against the piston when it is in the first position.

The valve may also have a second seal placed between the outer surface of the piston and the cylindrical bore of the valve body, to prevent airflow past the piston. The second seal may be an O-ring installed in a circumferential groove in an exterior surface the piston, or the seal may be installed in a circumferential groove in an internal surface of the bore in the valve body.

The valve may have a spring seat member for the spring, the spring seat member having an adjustable position. This adjustment may be made by having a threaded portion on the inner surface of the valve body, and the exterior of the spring seat member may be threaded to engage the threads of the valve body.

A portion of the spring seat member at the end closest to the pilot connection may be formed so as to be rotated by a torque exerting tool inserted through the second end of the valve body to advance the spring seat member relative to the valve body whereby a force exerted by the first spring on the at least one piston may be adjusted. This adjustment may be made so that if the pilot pressure drops so that the valve opens, then the loss in pressure of the compressed air system can be limited to, for example, 10 psi or less before the spring overcomes the pressure at the service end of the valve, and closes the valve.

The spring seat member may be adjusted so that the valve is closed if the pilot pressure plus a predetermined positive constant is algebraically greater than the first pressure, and is opened if the pilot pressure plus the predetermined positive constant is algebraically less than the first pressure.

In a second embodiment, the valve also has a second piston also placed at least partially within the bore, the second piston closer to the pilot end of the valve than the first piston. The second piston can be moved to contact the first piston at the end adjacent the first piston, and can be moved to contact a fixed seat adjacent the second end of the valve body at the other end of the second piston.

A seal may be placed between the end of the second piston and the fixed seat at the pilot pressure end of the valve body, and a spring may be placed to exert a force between the second piston and the valve body to bias it toward the first piston, so it presses against the first piston and the seal at the service end of the valve is compressed by the first piston, whereby the flowpath to the exhaust port is closed. This occurs when the pilot pressure is approximately equal to the service pressure.

A timing volume may be formed within the first piston, the timing volume communicating with the end of the first piston adjacent the second piston. A timing flow passage may be provided in a timing member providing a small flow passage between the service end of the valve body and the timing volume, so that the valve functions as follows:

If a relatively high pressure exists at both the service connection and the pilot connection, the spring urges the second piston toward the first piston, thus forcing the first piston against the first seal and placing the valve in a shut off position. Then, if a sudden drop of pilot pressure occurs, both pistons will be impelled toward the pilot end of the valve body by the pressure difference between the pressure at the service connection and the pilot pressure. Hence, an opening is provided through which air from the service connection flows out of the exhaust port. At the same time, air is flowing through the timing flow passage into the timing chamber to equalize the pressure in the space between the first cylinder and the second cylinder with the service pressure. This occurs at a predetermined rate determined by the volume of the timing chamber and the flow impedance of the timing flow passage. Hence, the first seal enclosing a relatively small area and the second seal enclosing a relatively large area, cause a net force due to air pressure on the first piston directed to the first end of the valve body thereby compressing the first sealing means and shutting off the valve. In this embodiment, very little loss in pressure of the compressed air system occurs because the valve is opened very briefly, as determined by the timing flowpath and the timing volume. This occurs whenever the pilot pressure is high and then drops. The pilot pressure in this case may be obtained from an unloader line which unloads the pressure at the discharge end of a compressor after it shuts off, so that when it is restarted, it will not need to start against a back pressure.

The timing flow passage may have a shield providing a clearance space having a minimum dimension smaller than the smallest diameter of the timing flow passage through which air must flow to reach the timing flow passage. This is to keep debris particles which would not pass through the timing flow passage from reaching the timing flow passage.

Either embodiment of the valve may have an electric heater formed as a blanket 90 wrapped around an exterior portion of the valve body. A cylindrical sheath 94 may be provided for fitting over the electric heater to protect the heater from mechanical damage, and to seal out moisture. An O-ring 98 or other seal may also be provided between the sheath and the exterior portion of the valve body to keep moisture away from the electric heater. The purpose of the electric heater would be for preventing icing of the water release valve.

The valve, in the version which has two pistons, may have a spring to bias the first piston toward the service end in order to bias the valve to a closed position. Either valve may also have a manual drain 104 which can be opened by hand to release water from the valve.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

I claim:

1. A water release valve for a compressed air system and for attachment to a low point of such compressed air system, said water release valve comprising:
    (a) a valve body having an internal space, said internal space having at least a subportion thereof formed as a cylindrical bore having an internal diameter, said valve further including:
        (i) a first connection means located at a first end of said valve body for attaching said water release valve to such low point of such compressed air system,
        (ii) a second connection means located at a second end of said valve body for receiving a pilot pressure from such compressed air system, and
        (iii) an exhaust port provided in said valve body;
    (b) a piston disposed at least partially within said cylindrical bore and having a translatable position in said bore determined at least in part by such pilot pressure received through said second connection;
    (c) said piston having at least first and second positions in said bore, said piston in said first position providing an obstruction occluding an exhaust flowpath for fluid from said first connection means to said exhaust port, said piston in said second position removing said obstruction thereby opening said exhaust flowpath from said first connection means to said exhaust port;
    (d) an electric heater in the form of a blanket wrapped around an exterior portion of said valve body for preventing the freezing of water in said valve;
    (e) a sheath for fitting over said electric heater blanket to protest the blanket; and
    (f) at least one seal located between said sheath and said exterior portion of said valve body for maintaining said heater blanket in a substantially moisture free environment.

\* \* \* \* \*